UNITED STATES PATENT OFFICE.

ALBERTO RUTHEL, OF SAVONA, ITALY.

IMPROVEMENT IN PURIFYING ILLUMINATING-GAS.

Specification forming part of Letters Patent No. 132,542, dated October 29, 1872.

*To all whom it may concern:*

Be it known that I, ALBERTO RUTHEL, gas-engineer, of Savona, in the Kingdom of Italy, have invented a certain Improvement relating to Purifying Gas, of which the following is a specification:

I employ a composition as a purifying means, spreading it on grates or similar supports in the purifying-vessels in layers of about eighteen inches depth, the grates or shelves being placed pretty closely together, so as to fill about five-sixths of the purifying-vessel with the composition. One cubic foot of this composition purifies about one-thousand cubic feet of coal-gas at each filling, and, on being taken out and exposed to the air, regenerates itself without further treatment, and is ready to be again used several times over. It regenerates too slowly after being several times used, and then requires a fresh treatment to revive it, but one which is easily and cheaply performed.

To prepare the composition I take a wooden box, water-tight, containing about one cubic yard, making it, by preference, five feet long, four feet wide, and six inches deep. Into this I put eight hundred pounds of finely-ground sulphur and one thousand four hundred pounds of iron filings or parings, cast or wrought. The iron must be as free as possible from oil or any kind of fat. The iron and sulphur are to be mingled intimately in a dry state. I then pour fresh water on the mixture and work it diligently with any suitable implement until it has acquired a semi-fluid condition. After continuing the agitation from ten to fifteen minutes, the length of time depending on the temperature, the composition will commence to effervesce and grow black. I ascribe the effervescence or boiling to an escape of hydrogen gas. After three or four hours this action gradually ceases and the composition appears entirely black. The mechanical agitation should be proceeded with during the whole period, and water should be added gradually so as to keep the composition in a condition of batter or porridge. After allowing the composition to remain quiet half an hour I mix with it about an equal bulk of wet sawdust. This may be done outside of the box. The mixture thus produced ceases to be fluid, but should remain wet. It is preferably shoveled in a heap. Oxidation now commences and occupies from three to four days' time. There is a tendency in the mixture to grow hot in this period, which renders it necessary to shovel it from time to time and to keep it wet by gradually adding water. The rise of temperature should not be stopped altogether, as such proceeding would stop the oxidation. Care should be taken, on the other hand, to keep the mixture wet. If the mixture grows too warm it shows a reddish luster on the outside. It requires shoveling over and agitating every two to three hours. On the third day it should have grown entirely red like the color of cinnamon. After four days' operation the composition is allowed to dry, and at this stage is sifted and the lumps crushed so that the whole is entirely pulverized. A quantity of sawdust is now added which may be varied within wide limits, the purpose being to decrease the specific gravity and increase the bulk of the composition. At this stage there is always added six hundred pounds of fresh-burnt lime, pulverized, and cold. The whole is now wet again and allowed to stand, shoveled in a heap, for twenty-four hours.

The composition so prepared is now ready to be put in the cleaning apparatus. It should be damp enough to be kneaded or worked without difficulty by the hand. As before suggested, the composition may be applied on each cleaning-plate to such a height as to leave only space enough to prevent the layers from touching each other. A purifying-vessel of six cubic yards capacity can receive five cubic yards of the composition. During the passage of the gas through the purifier the composition darkens in color. After passing through about one thousand cubic feet for each cubic foot of the original composition it will be thoroughly black. It should now be taken out of the cleaner and spread on the floor. Under these conditions the composition becomes regenerated after about twelve hours, showing the proper reddish color, and it is now fit to be used again after being again properly moistened for the purpose.

This composition has been in use twenty-seven months in the gas-works of Savona. It yet regenerates thoroughly in from twenty-four to thirty-six hours, and continues to purify at each filling one thousand cubic feet of gas for each cubic foot of the original composition.

It appears that it requires longer time for regeneration after each use. After about two years the composition regenerates so slowly that it should be subjected to the following operation: The composition should be left in the purifier a little longer than usual, so as to acquire a very black color. It is then taken out and mixed with one-half of its weight of fresh-iron filings, a suitable quantity of water being poured on it and agitated in the same way as first described for new composition; but no sulphur is added. I believe that the sulphur which has been from time to time absorbed from the gas remains in the composition, so as to avoid the necessity for such addition. No lime is needed at this stage; but sawdust should be added at each new operation, so as to lower the specific gravity.

The old Lamming's composition, containing copperas, becomes regenerated in a somewhat similar manner by the addition of fresh iron filings, provided the same are added immediately after the old composition is taken from the cleaner. It is only at this moment that the sulphur in the composition is free and in a proper condition to join the iron.

By this invention much labor is saved, and some space is economized as compared with any process previously known to me. The odor diffused when the covers are removed is less than with other processes, which is an important point in many localities.

I claim as my invention—

1. The within-described composition for gas-purifying, containing sulphur and iron combined, substantially in the manner herein set forth.

2. The gas-purifying composition described, composed of sulphur, iron, and lime mingled in the manner and about the proportions herein specified.

3. A gas-purifying composition of iron, sulphur, and lime, lightened and made porous by the addition of sawdust or analogous neutral material, as and for the purposes herein set forth.

4. The process herein described of manufacturing gas-purifying composition.

In testimony whereof I have hereunto set my hand this 12th day of August, 1872, in the presence of two subscribing witnesses.

ALBERTO RUTHEL.

Witnesses:
GUISEPPE RADIF,
H. CHAMPENOIS.